US012587989B2

(12) United States Patent
Kaushik et al.

(10) Patent No.: US 12,587,989 B2
(45) Date of Patent: Mar. 24, 2026

(54) SHARED DATA SUPPORT (SDS) RULES SELECTION AND ENFORCEMENT IN A WIRELESS COMMUNICATION NETWORK

(71) Applicant: T-MOBILE INNOVATIONS LLC, Overland Park, KS (US)

(72) Inventors: Subramania Kaushik, Bellevue, WA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 337 days.

(21) Appl. No.: 18/502,788

(22) Filed: Nov. 6, 2023

(65) Prior Publication Data
US 2025/0151000 A1    May 8, 2025

(51) Int. Cl.
*H04W 60/00*    (2009.01)
*H04W 8/24*    (2009.01)

(52) U.S. Cl.
CPC ............. *H04W 60/00* (2013.01); *H04W 8/24* (2013.01)

(58) Field of Classification Search
CPC .......... H04W 60/00; H04W 8/24; H04W 8/18
USPC ...................................................... 455/435.1
See application file for complete search history.

(56) References Cited

U.S. PATENT DOCUMENTS

| | | | |
|---|---|---|---|
| 10,849,094 B2 | 11/2020 | Kim et al. | |
| 10,917,527 B2 | 2/2021 | Ahmadi et al. | |
| 11,012,857 B1 | 5/2021 | Malhotra et al. | |
| 11,082,393 B2 | 8/2021 | Goel | |
| 11,184,838 B2 | 11/2021 | Park et al. | |
| 2012/0297076 A1* | 11/2012 | Wu ...................... | H04L 12/1403 709/227 |
| 2012/0307798 A1* | 12/2012 | Zhou ....................... | H04W 4/00 370/329 |
| 2022/0225212 A1* | 7/2022 | Zhu ....................... | H04W 12/08 |
| 2024/0137746 A1* | 4/2024 | Sasi ...................... | H04L 41/082 |

* cited by examiner

*Primary Examiner* — Don N Vo

(57) ABSTRACT

Various embodiments comprise a wireless communication network to select Shared Data Support (SDS) rules for a user device. In some examples, the wireless communication network comprises a network controller and a network data system. The network controller receives a registration request from the user device and transfers a subscription data request to the data system. The network data system retrieves subscription data for the user device from the device's subscriber profile. The network data system determines the device type, slice ID, billing ID, region, software version, and PLMN ID for the user device. The network data system selects SDS rules based on the determined information and selects shared subscription data based on the SDS rules. The network data system transfers the subscription data and shared subscription data to the network controller. The network controller generates device context using the subscription data and shared subscription data to serve the user device.

20 Claims, 11 Drawing Sheets

200⟋

THE NETWORK DATA SYSTEM RECEIVING SUBSCRIPTION DATA REQUEST FROM A NETWORK CONTROLLER. ⌐201

THE NETWORK DATA SYSTEM ACCESSING A SUBSCRIBER PROFILE FOR THE USER DEVICE. ⌐202

THE NETWORK DATA SYSTEM ACCESSING RETRIEVING SUBSCRIPTION DATA FOR THE USER DEVICE FROM THE SUBSCRIBER PROFILE. ⌐203

THE NETWORK DATA SYSTEM DETERMINING A DEVICE TYPE FOR THE WIRELESS USER DEVICE. ⌐204

THE NETWORK DATA SYSTEM SELECTING SHARED DATA SUPPORT (SDS) RULES FOR THE WIRELESS USER DEVICE BASED ON THE DEVICE TYPE. ⌐205

THE NETWORK DATA SYSTEM SELECTING SHARED SUBSCRIPTION DATA FOR THE USER DEVICE BASED ON THE SDS RULES. ⌐206

THE NETWORK DATA SYSTEM TRANSFERRING THE SUBSCRIPTION DATA AND THE SHARED SUBSCRIPTION DATA TO THE NETWORK CONTROLLER. ⌐207

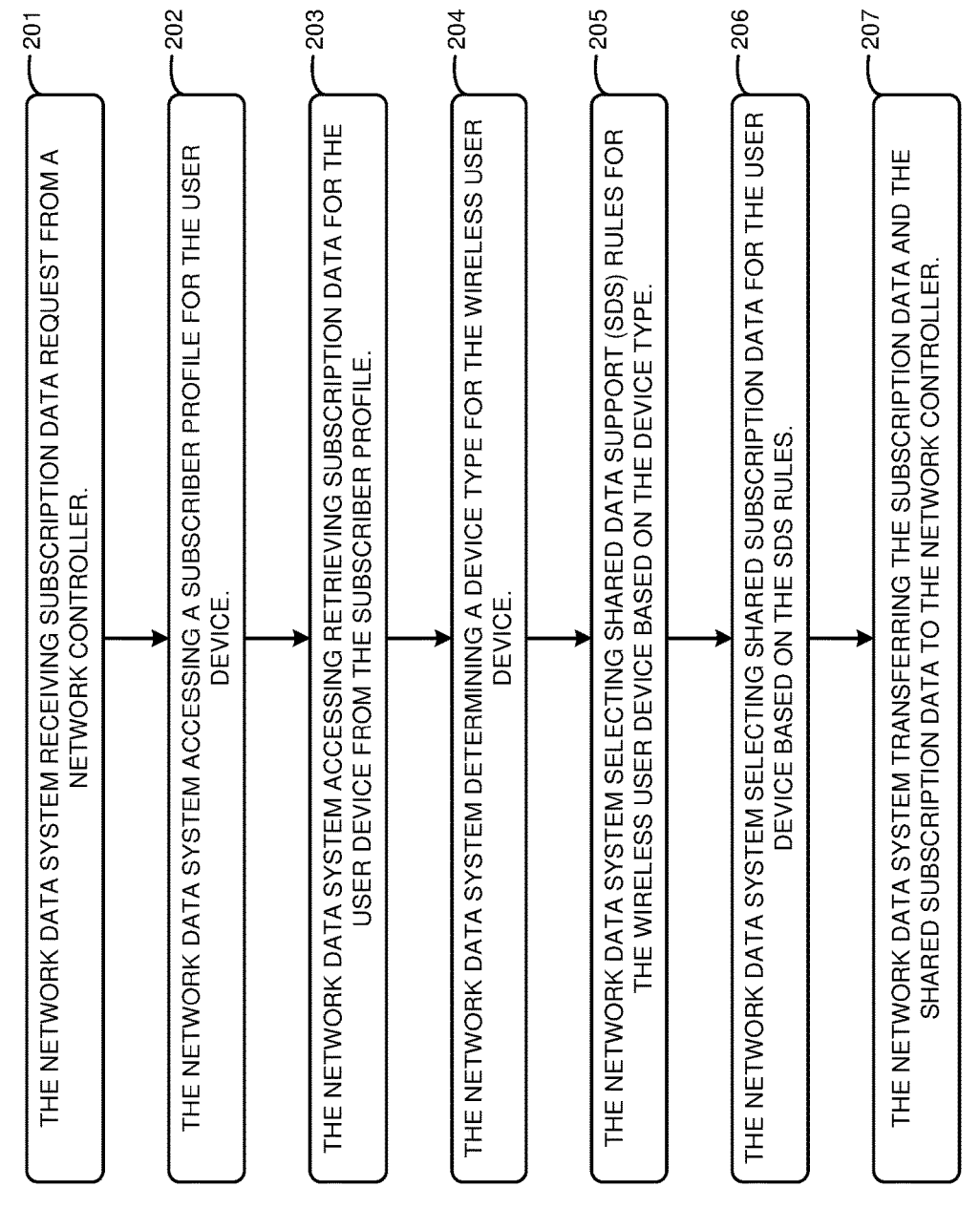

THE NETWORK DATA SYSTEM RECEIVING SUBSCRIPTION DATA REQUEST FROM A NETWORK CONTROLLER.
201

THE NETWORK DATA SYSTEM ACCESSING A SUBSCRIBER PROFILE FOR THE USER DEVICE.
202

THE NETWORK DATA SYSTEM ACCESSING RETRIEVING SUBSCRIPTION DATA FOR THE USER DEVICE FROM THE SUBSCRIBER PROFILE.
203

THE NETWORK DATA SYSTEM DETERMINING A DEVICE TYPE FOR THE WIRELESS USER DEVICE.
204

THE NETWORK DATA SYSTEM SELECTING SHARED DATA SUPPORT (SDS) RULES FOR THE WIRELESS USER DEVICE BASED ON THE DEVICE TYPE.
205

THE NETWORK DATA SYSTEM SELECTING SHARED SUBSCRIPTION DATA FOR THE USER DEVICE BASED ON THE SDS RULES.
206

THE NETWORK DATA SYSTEM TRANSFERRING THE SUBSCRIPTION DATA AND THE SHARED SUBSCRIPTION DATA TO THE NETWORK CONTROLLER.
207

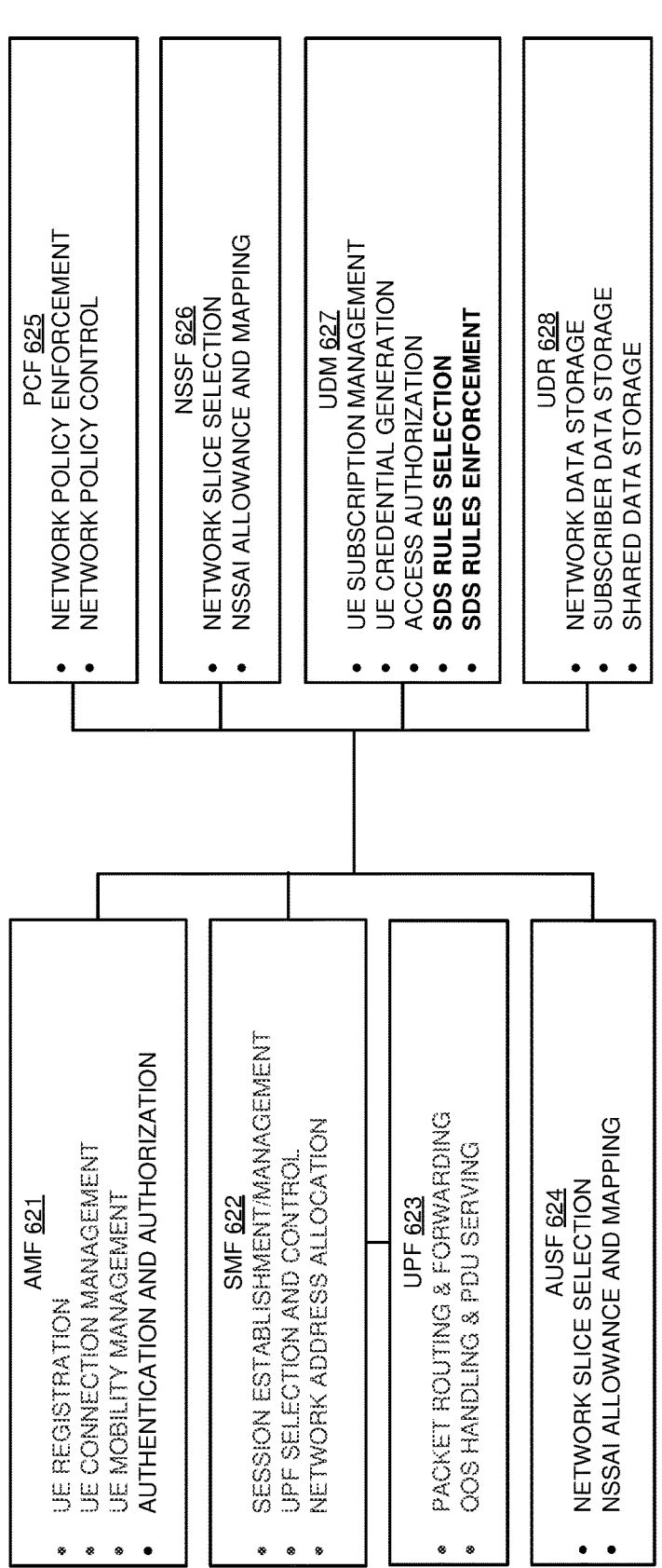

AMF 621
- UE REGISTRATION
- UE CONNECTION MANAGEMENT
- UE MOBILITY MANAGEMENT
- AUTHENTICATION AND AUTHORIZATION

SMF 622
- SESSION ESTABLISHMENT/MANAGEMENT
- UPF SELECTION AND CONTROL
- NETWORK ADDRESS ALLOCATION

UPF 623
- PACKET ROUTING & FORWARDING
- QOS HANDLING & PDU SERVING

AUSF 624
- NETWORK SLICE SELECTION
- NSSAI ALLOWANCE AND MAPPING

PCF 625
- NETWORK POLICY ENFORCEMENT
- NETWORK POLICY CONTROL

NSSF 626
- NETWORK SLICE SELECTION
- NSSAI ALLOWANCE AND MAPPING

UDM 627
- UE SUBSCRIPTION MANAGEMENT
- UE CREDENTIAL GENERATION
- ACCESS AUTHORIZATION
- SDS RULES SELECTION
- SDS RULES ENFORCEMENT

UDR 628
- NETWORK DATA STORAGE
- SUBSCRIBER DATA STORAGE
- SHARED DATA STORAGE

SHARED DATA SUPPORT (SDS) RULES SELECTION AND ENFORCEMENT IN A WIRELESS COMMUNICATION NETWORK

TECHNICAL FIELD

Various embodiments of the present technology relate to User Equipment (UE) subscription management, and more specifically, to selecting and enforcing Shared Data Support (SDS) rules for wireless UE.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices. Exemplary network functions include Access and Mobility Management Function (AMF) and Unified Data Management (UDM).

The home network of a user device stores subscription data for the user device. The subscription data comprises a set of service attributes that define the level of service to be provided to the user device based on the user's subscription. Exemplary service attributes include access and mobility subscription data, session management subscription data, network slice subscription data, and the like. When a user device attaches to the wireless communication network, the core network accesses a subscriber profile for the user device that stores the user's subscription data. The core network provides wireless data services to the user device based on the user's subscription data. The user's subscription data is referred to as individual subscription data.

Another type of subscription data is shared subscription data. Shared subscription data comprise service attributes shared by multiple user devices. Wireless communication networks select shared subscription data for wireless user devices based on the Public Land Mobile Network (PLMN) of the wireless user device. However, some user devices lack the capability to implement shared service attributes. Wireless communication networks are dynamic environments. Selecting shared subscription data based on the PLMN of the user device does not account for changing network conditions nor the capabilities of the device itself. Unfortunately, wireless communication networks do not effectively and efficiently select shared data for wireless user devices.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for user subscription management. Some embodiments comprise a method of operating a wireless communication network to select Shared Data Support (SDS) rules for a user device. The method comprises a network controller receiving a registration request transferred by the user device for service on the wireless communication network and in response, transferring a subscription data request to a network data system. The method further comprises the network data system receiving the subscription data request, accessing a subscriber profile for the user device, and retrieving subscription data for the user device. The method further comprises the network data system determining a device type for the wireless user device, selecting the SDS rules for the wireless user device based on the device type, and selecting shared subscription data for the user device based on the SDS rules. The method further comprises the network data system transferring the subscription data and the shared subscription data to the network controller. The method further comprises the network controller receiving the subscription data and the shared subscription data, generating device context based on the subscription data and the shared subscription data, and serving the wireless user device based on the device context.

Some embodiments comprise a wireless communication network to select SDS rules for a user device. The wireless communication network comprises a network controller and a network data system. The network controller receives a registration request transferred by the user device for service on the wireless communication network and in response, transfers a subscription data request to a network data system. The network data system receives the subscription data request, accesses a subscriber profile for the user device, and retrieves subscription data for the user device. The network data system determines a device type for the wireless user device, selects the SDS rules for the wireless user device based on the device type, and selects shared subscription data for the user device based on the SDS rules. The network data system transfers the subscription data and the shared subscription data to the network controller. The network controller receives the subscription data and the shared subscription data, generates device context based on the subscription data and the shared subscription data, and serves the wireless user device based on the device context.

Some embodiments comprise a wireless communication network to select SDS rules for a User Equipment (UE). The wireless communication network comprises an Access and Mobility Management Function (AMF) and a Unified Data Management (UDM). The AMF receives a registration request transferred by the UE and in response, transfers a subscription data request to the UDM. The UDM receives the subscription data request, accesses a subscriber profile for the UE stored by a Unified Data Repository (UDR), and retrieves subscription data for the UE from the UDR. The UDM determines a Permanent Equipment Identifier Type Allocation Code (PEI TAC) for the UE, selects the SDS rules for the UE based on the PEI TAC, and retrieves shared subscription data for the UE from the UDR based on the SDS rules. The UDM transfers the subscription data and the shared subscription data to the AMF. The AMF receives the subscription data and the shared subscription data, generates UE context based on the subscription data and the shared subscription data, and serves the UE based on the UE context.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2A illustrates an exemplary operation of the communication network to select SDS rules for the user device.

FIG. 9 further illustrates the NFVI in the 5G wireless communication network.

Figure 1:
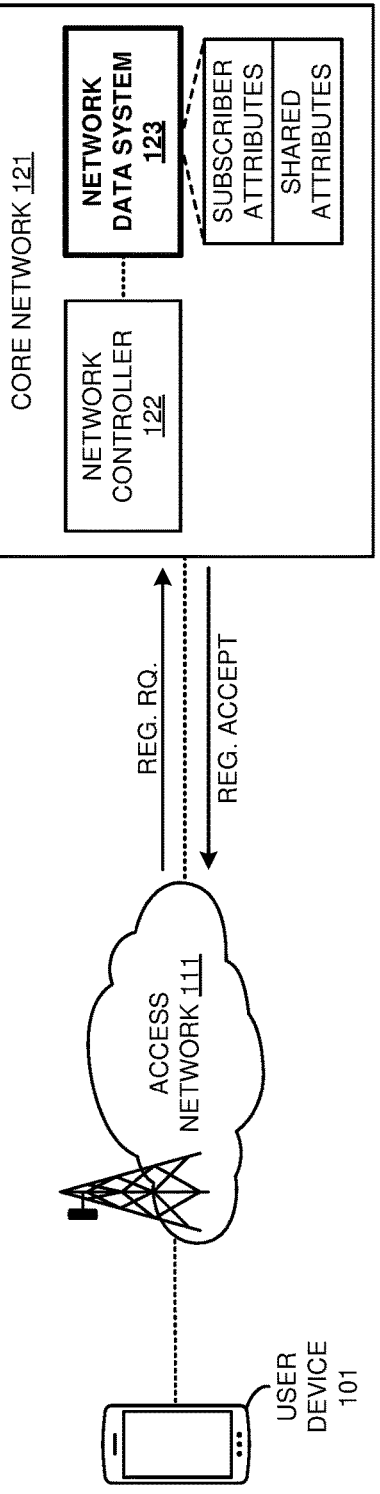
FIG. 1 illustrates a communication network to select Shared Data Support (SDS) rules for a user device.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication network 100 network to select Shared Data Support (SDS) rules for a user device. Communication network 100 delivers services like voice calling, machine communications, internet-access, media-streaming, or some other wireless/wireline communications product to user devices. Communication network 100 comprises user device 101, access network 111, and core network 121. Core network 121 comprises network controller 122 and network data system 123. In other examples, communication network 100 may comprise additional or different elements than those illustrated in FIG. 1.

Various examples of network operation and configuration are described herein. In some examples, network controller 122 receives a registration request (REG. RQ.) transferred by user device 101 over access network 111 for service on network 100. Network controller 122 processes the request to register user device 101 for wireless data services. Upon registration, network controller 122 transfers a subscription data request to network data system 123. Exemplary subscription data includes service attributes like Quality-of-Service (QOS), data network addresses, slice selection criteria, access and mobility data, and the like. As illustrated in FIG. 1, network data system 123 stores subscriber attributes and shared attributes. The subscriber attributes are service attributes that device 101 is subscribed for and are typically stored in the subscriber profile for device 101. The shared service attributes comprise service attributes that may be shared amongst multiple user devices. The shared attributes may be used to override the subscribed service attributes of a device to modify the level of service provided to the wireless user device. SDS rules govern which of the shared attributes are selected for a given user device.

Network data system 123 receives the request from controller 122 and accesses the subscriber profile for device 101 to retrieve subscribed service attributes for device 101. Network data system 123 performs a device type check for device 101. For example, data system 123 may identify the Permanent Equipment Identifier Type Allocation Code (PEI TAC) for device 101 to determine the device type for device 101. Data system 123 selects SDS rules for user device 101 based on the device type and selects a set of shared service attributes for device 101 based on the SDS rules. For example, the SDS rules may indicate device 101 qualifies for shared access and mobility policies and data system 123 may override device 101's subscribed access and mobility policies with the shared policies. Data system 123 returns the subscribed service attributes and shared service attributes to network controller 122. Network controller 122 forms context for device 101 using the attributes. Network controller 122 serves device 101 over access network 111 based on the context.

User device 101 is representative of a wireless/wireline user device. Exemplary user devices include phones, smartphones, computers, vehicles, drones, robots, sensors, and/or other devices with wireless communication capabilities. Access network 111 exchanges wireless signals with user devices 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or other types of wireless/wireline access systems to provide wireless links to user devices 101, the backhaul links to core network 121, and the edge computing services between user devices 101 and core network 121.

Access network 111 comprises wireless access nodes to serve user devices 101. The access nodes may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121.

Core network 121 is representative of computing systems that provide wireless data services to user devices 101 over access network 111. Exemplary computing systems comprise data centers, server farms, Network Function Virtualization Infrastructure (NFVI), cloud computing networks, hybrid cloud networks, and the like. The computing systems of core network 121 store and execute the network functions to form network controller 122 and data system 123 to provide wireless data services to user devices 101 over access network 111. Network controller 122 may comprise network functions like Access and Mobility Management Function (AMF) and the like. Network data system 123 may comprise network entities like Unified Data Management (UDM), Unified Data Registry (UDR), and the like. The computing systems of core network 121 typically store and execute other network functions to form a user plane (not illustrated) to support user data exchange over network 121. The user plane typically comprises network functions like User Plane Function (UPF) and the like. Core network 121 may comprise a Fifth Generation Core (5GC) architecture, an Evolved Packet Core (EPC) architecture, and the like.

FIG. 2A illustrates process 200. Process 200 comprises an exemplary operation of communication network 100 to select SDS rules for the user device. The operation may vary in other examples. The operations of process 200 comprise a network data system receiving a subscription data request from a network controller (step 201). The operations further comprise the network data system accessing a subscriber profile for the user device (step 202). The operations further comprise the network data system retrieving subscription data for the user device from the subscriber profile (step 203). The operations further comprise the network data system determining a device type for the wireless user device (step 204). The operations further comprise the network data system selecting SDS rules for the wireless user device based on the device type (step 205). The operations further comprise the network data system selecting shared subscription data for the user device based on the SDS rules (step 206). The operations further comprise the network data system transferring the subscription data and the shared subscription data to the network controller (step 207).

Figure 2B:
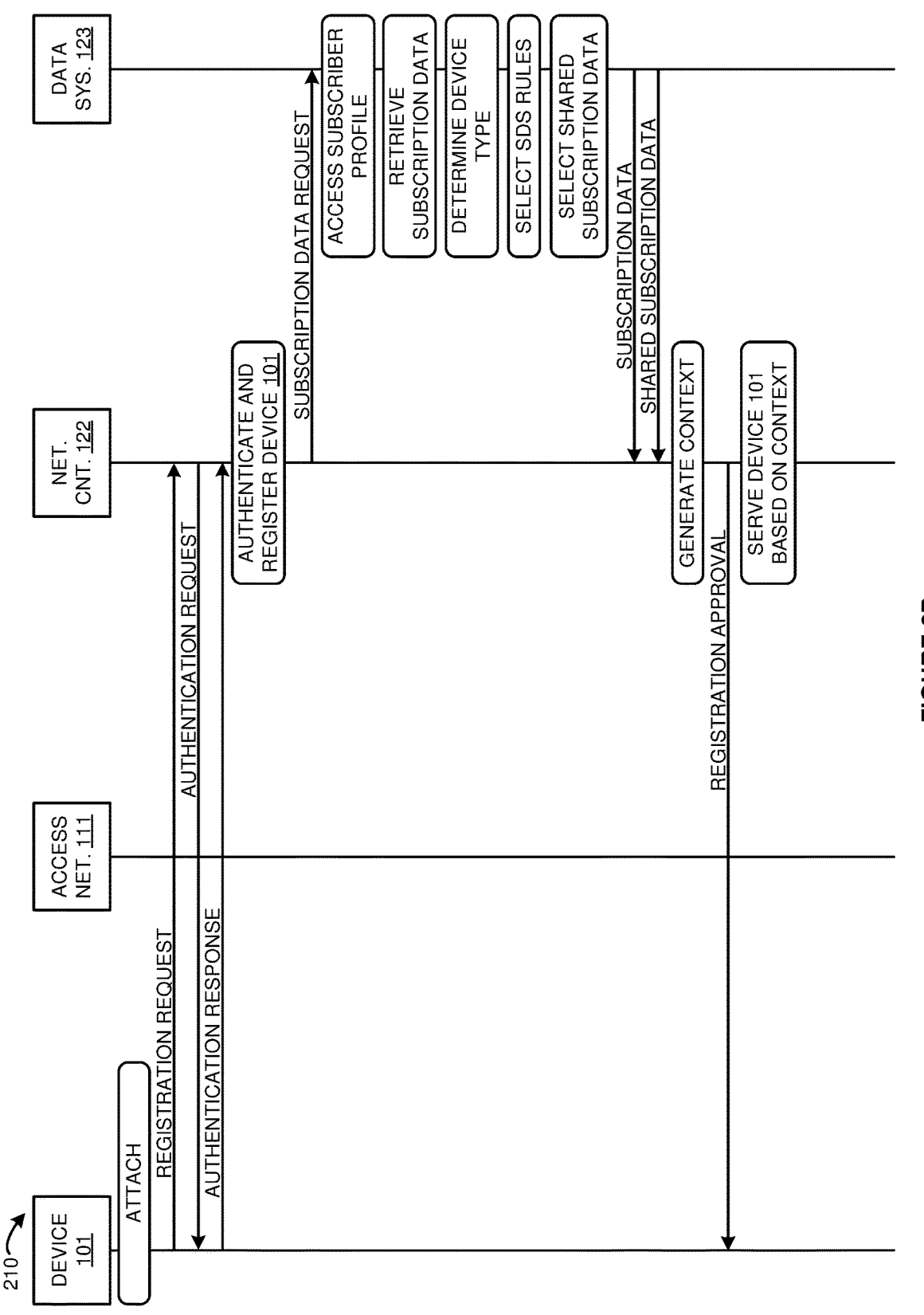
FIG. 2B illustrates an exemplary operation of the communication network to select SDS rules for the user device.

FIG. 2B illustrates process 210. Process 210 comprises exemplary operations of communication network 100 to select SDS rules for a user device. Process 210 comprises an example of process 200 illustrated in FIG. 2A, however process 200 may differ. In some examples, user device 101 attaches to access network (NET.) 111 and transfers a registration request to network controller (NET. CNT.) 122 over access network 111. Network controller 123 responds to the request by transferring an authentication request for an identity indication to device 101. Device 101 transfers an authentication response comprising the identity indication to controller 122 over access network 111. Network controller 122 processes the identity indication to authenticate device 101 and registers device 101 on core network 121 in response to the successful authentication.

Network controller 122 transfers a subscription data request to network data system (SYS.) 123 to retrieve subscription data that defines the level of service to be provided to device 101. The subscription data request indicates the identity of device 101 and may indicate the device type of device 101. Data system 123 receives the request and accesses device 101's subscriber profile to retrieve subscription data for device 101 from the subscriber profile. Data system 123 determines the device type for device 101 and selects SDS rules based on the device type. For example, data system 123 may determine the device type based on the subscription data request and/or based on information pulled from the subscriber profile. Data system 123 uses the SDS rules to select shared subscription data for device 101. Data system 123 may override some or all of device 101's subscription data using the shared subscription data selected using the SDS rules. For example, the SDS rules may indicate device 101 qualifies for a shared QoS level that differs from device 101's subscribed QoS level. Data system 123 may select the shared QoS level using the SDS rules and override device 101's subscribed QoS level using the shared level.

Data system 123 transfers the subscription data retrieved from device 101's subscriber profile and the shared subscription data selected using the SDS rules to network controller 122. Network controller 122 generates device context for user device 101. The device context includes the subscription data and the shared subscription data. For example, the device context may include QoS levels, allowed slice types, service attributes, network policies, and/or other subscribed/shared subscription data that defines the level of service for device 101. Network controller 123 transfers a registration approval message to device 101 over access network 111. The registration approval message signifies to device 101 that device 101 may begin data and/or multimedia sessions over core network 121. Network controller 122 services device 101 based on the context.

Figure 3:
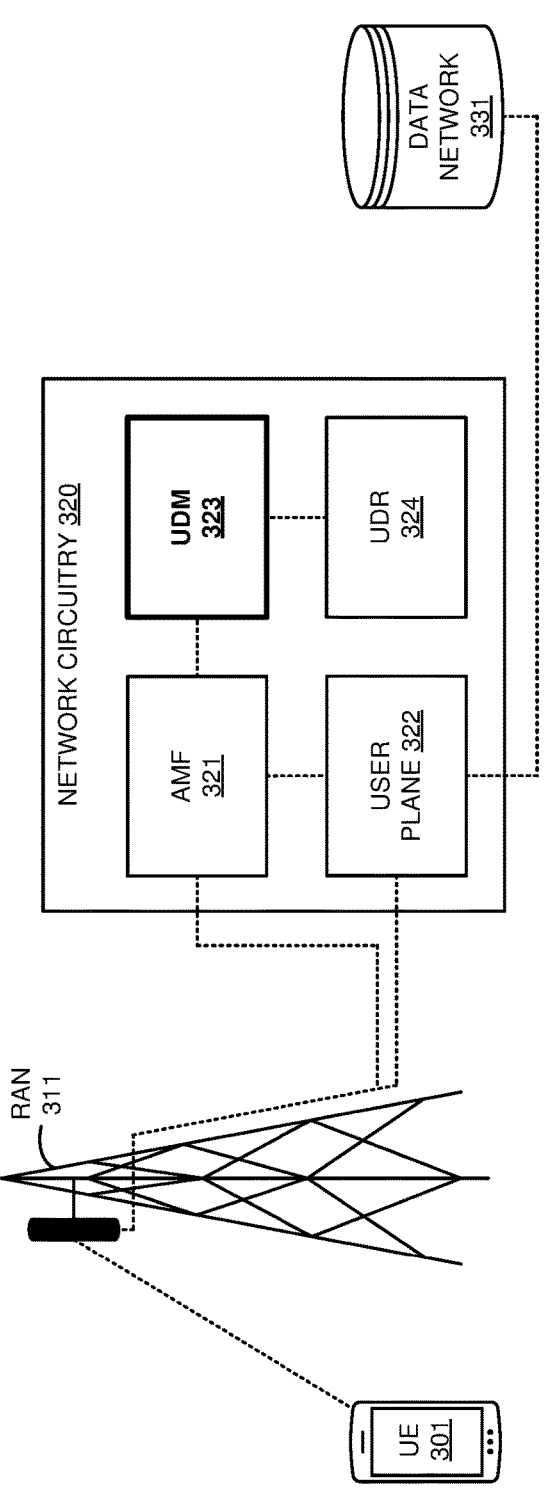
FIG. 3 illustrates a wireless communication network to select SDS rules for a wireless User Equipment (UE).

FIG. 3 illustrates wireless communication network 300 to select SDS rules for a User Equipment (UE). Wireless communication network 300 is an example of communication network 100, however network 100 may differ. Wireless communication network 300 comprises User Equipment (UE) 301, RAN 311, network circuitry 320, and data network 331. Network circuitry 320 comprises AMF 321, user plane 322, UDM 323, and UDR 324. In other examples, wireless network 300 may comprise additional or different elements than those illustrated in FIG. 3.

In some examples, UE 301 attaches to AMF 321 over RAN 311 and transfers a registration request to AMF 321. AMF 321 receives the registration request and interacts with UDM 323 to authenticate the identity of UE 301. In response to the authentication, AMF 321 registers UE 301 and transfers a context request for service attributes to UDM 323. UDM 323 receives the request and access the subscriber profile for UE 301 stored by UDR 324. The context request includes a device type indication for UE 301 and may include an SDS capability indication for UE 301 and/or AMF 321. UDM 323 determines the device type of UE 301 based on the indication included in the registration request and selects SDS rules for UE 301 based on the device type. Alternatively, UDM 323 may retrieve device type information for UE 301 from the subscriber profile to determine the device type of UE 301. It should be appreciated that some device types may not possess SDS capabilities (e.g., Internet-of-Things (IoT) devices). By screening for these devices, UDM 323 more efficiently enforces SDS rules on network 300.

UDM 323 retrieves service attributes UE 301 is subscribed for from the subscriber profile stored on UDR 324. UDM 323 also retrieves shared service attributes for UDR 324 based on the SDS rules for UE 301. UDM 323 overrides ones of the subscriber attributes with corresponding ones of the shared attributes and returns the attributes to AMF 321. AMF 321 uses the received service attributes to form UE context for UE 301. AMF 321 directs user plane 322 to serve UE 301 based on the context and directs UE 301 to begin its session on network 300 over RAN 311. UE 301 exchanges user data with user plane 322 over RAN 311. User plane 322 exchanges the user data with data network 331. AMF 321 and user plane 322 control the data session of UE 301 (e.g., enforce QoS and latency requirements based on the shared and subscribed service attributes) based on the UE context.

Advantageously, wireless communication network 300 efficiently selects SDS rules for UE 300 based on the device type for UE 300. Moreover, wireless communication network 300 effectively enforces shared service attributes for UE 300 by overriding subscribed service attributes with corresponding shared service attributes.

UE 301 and RAN 311 communicate over links using wireless technologies like 5GNR, LTE, LP-WAN, WIFI, Bluetooth, and/or some other type of wireless networking protocol. The wireless technologies use electromagnetic frequencies in the low-band, mid-band, high-band, or some other portion of the electromagnetic spectrum. RAN 311, network circuitry 320, and data network 331 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliance with wireless or wireline communication circuitry. Although RAN 311 is illustrated as a tower, RAN 311 may comprise another type of mounting structure (e.g., buildings), or no mounting structure at all. RAN 311 comprises Fifth Generation (5G) RANS, LTE RANs, gNodeBs, eNodeBs, NB-IoT access nodes, LP-WAN base stations, wireless relays, WIFI hotspots, Bluetooth access nodes, and/or other types of wireless or wireline network transceivers. UE 301, and RAN 311 comprise antennas, amplifiers, filters, modulation, analog/digital interfaces, microprocessors, software, memories, transceivers, bus circuitry, and the like. User plane 322 comprises network functions like UPF and the like.

UE 301, RAN 311, network circuitry 320, and data network 331 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
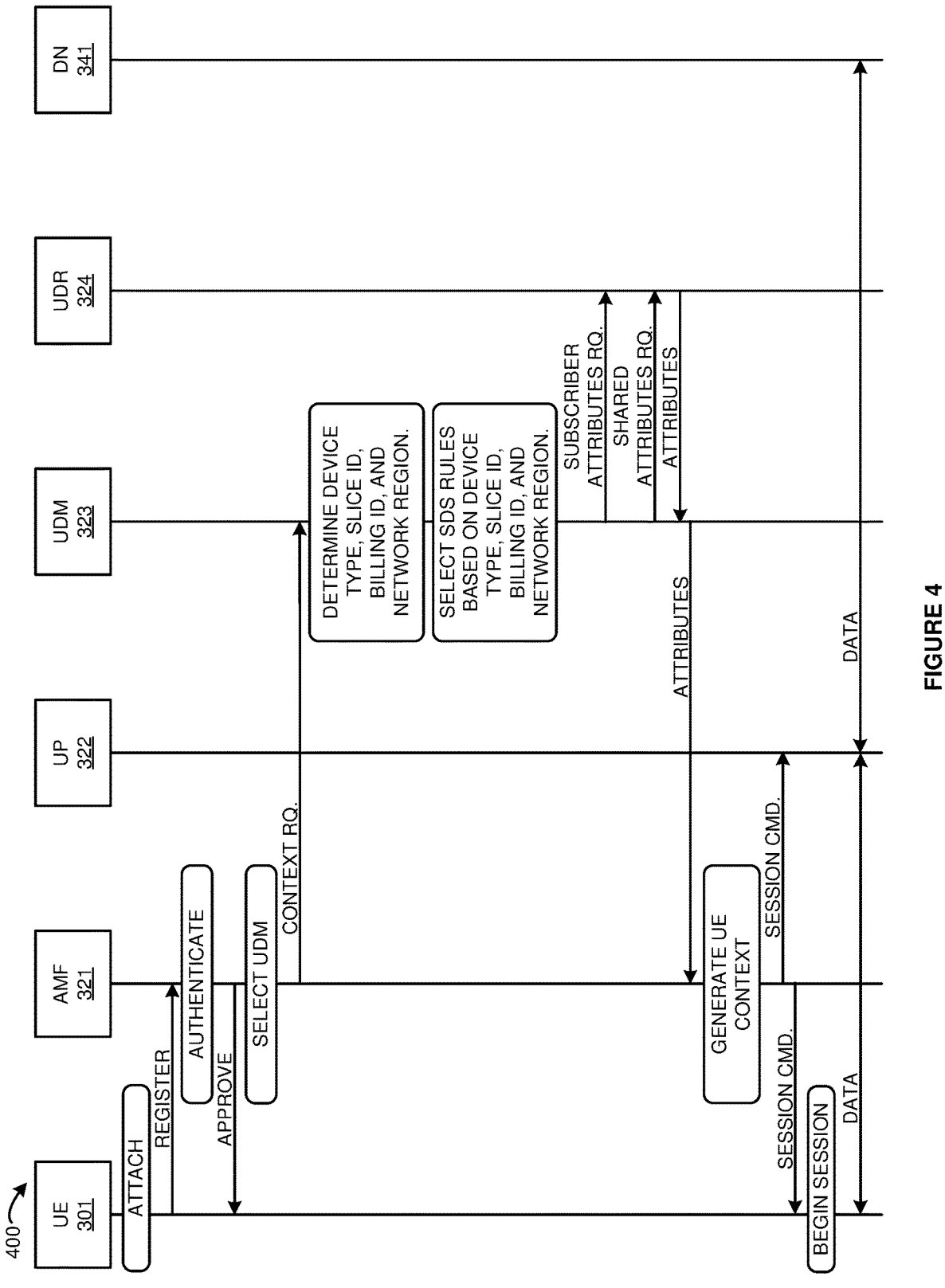
FIG. 4 illustrates an exemplary operation of the wireless communication network to select SDS rules for the wireless UE.

FIG. 4 illustrates processes 400. Process 400 comprises exemplary operations of wireless communication network 300 to select SDS rules for a UE. Process 400 comprises an example of process 200 illustrated in FIG. 2A and process 210 illustrated in FIG. 2B, however processes 200 and 210 may differ. In some examples, UE 301 attaches to RAN 311 and wirelessly transfers a registration request to RAN 311. RAN 311 forwards the registration request to AMF 321. AMF 321 detects the registration request and in response, exchanges registration signaling with UE 301 over RAN 311 and with UDM 323 to authenticate UE 301. Responsive to the authentication, AMF 321 registers UE 301 for wireless data services and transfers an International Mobile Equipment Identity (IMEI) request to UE 301. UE 301 retrieves its IMEI from memory and transfers its IMEI to AMF 321 over RAN 311. Control plane 121 reads the first eight digits of the IMEI received from UE 301 to determine the device type of UE 301.

AMF 321 transfers a context request (RQ.) for UE 301 to UDM 323 to retrieve service attributes that characterize the level of data service to be provided to UE 301. The context request includes information like the AMF Identifier (ID), supported features, and the device type for UE 301. UDM 323 determines the device type for UE 301 and the geographic location of AMF 321 based on the context request. UDM 323 accesses the subscriber profile for UE 301 stored by UDR 324 to retrieve the billing ID for UE 301 and allowed slice IDs for UE 301. UDM 323 selects SDS rules for UE 301 based on the device type, billing ID, and allowed slice IDs of UE 301 and the location of AMF 321. UDM 323 accesses the subscriber profile for UE 301 stored by UDR 324 to retrieve subscribed service attributes. UDM 323 uses the SDS rules to select shared service attributes for UE 301 stored by UDR 324. UDM 323 overrides ones of the subscribed service attributes with corresponding ones of the shared service attributes. For example, the SDS rules may indicate UE 301 qualifies for enhanced QoS and latency service and UDM 323 may override UE 301's subscribed QoS and latency service attributes with the shared QoS and latency service attributes. UDM 321 returns the service attributes to AMF 321.

AMF 321 forms UE context for UE 301 using the received attributes. AMF 321 generates a registration accept message comprising the service attributes and directs user plane 322 to serve UE 301. AMF 321 transfers the registration accept message to RAN 311 which wirelessly transfers the registration accept message to UE 301. UE 301 begins a data session and exchanges user data for the session with user plane (UP) 322 over RAN 311 based on the subscribed and shared service attributes included in the registration accept message. User plane 322 exchanges the user data with data network 331.

Figure 5:
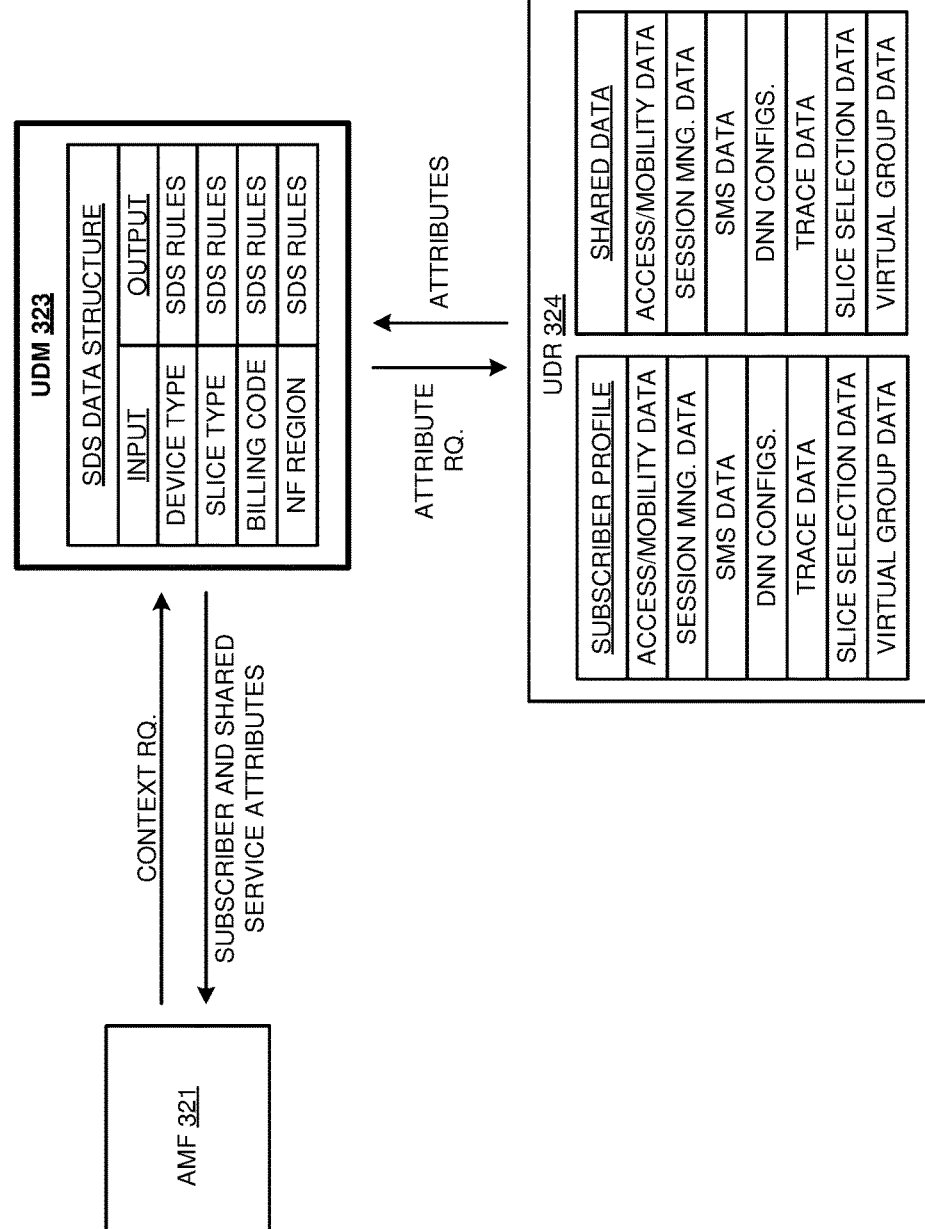
FIG. 5 further illustrates the wireless communication network to select SDS rules for the wireless UE.

FIG. 5 illustrates AMF 321, UDM 323, and UDR 324 in wireless communication network to select SDS rules for a UE. In some examples, UDM 323 hosts the SDS data structure illustrated in FIG. 5. The SDS data structure correlates a set of input conditions to SDS rules. In this example, the input conditions comprise device type, slice type, billing code, and network function (NF) region. Each of these input conditions correlates to one or more SDS rules to select shared data attributes for UE 301. These input conditions are exemplary and may differ in other examples.

For example, the SDS data structure may comprise input conditions for Public Land Mobile Network (PLMN) and UE software version. UDM 323 derives the input conditions based on the context request received from AMF 321 and/or based on subscriber information from the subscriber profile stored by URD 324.

UDR 324 stores the subscriber profile for UE 301 and shared data attributes illustrated in FIG. 5. The subscriber profile includes service attributes for access and mobility data, session management (MNG.) data, Short Message Service (SMS) data, Data Network Name (DNN) configurations, trace data, slice selection data, and virtual group data. The shared data attributes comprise shared access and mobility data, shared session management data, shared SMS data, shared DNN configurations, shared trace data, shared slice selection data, and shared virtual group data. UDM 323 inputs the device type, slice type, and billing code for UE 301 and the region for AMF 321 into the data structure to generate SDS rules. UDM 323 then uses the SDS rules to select ones of the shared access and mobility data, shared SMS data, shared DNN configurations, shared trace data, shared slice selection data, and shared virtual group data. For example, the billing code of UE 301 may correlate to an SDS rule that selects for shared DNN configurations. UDR 324 transfers the subscribed service attributes and selected ones of the shared service attributes to UDM 323. UDM 323 uses the selected shared attributes to override corresponding ones of the subscriber attributes. For example, UDM 323 may override the subscribed DNN configurations with the shared DNN configurations. UDM 323 provides the non-overridden subscribed service attributes and the selected shared service attributes to AMF 321 to generate UE context for UE 301.

Figure 6:
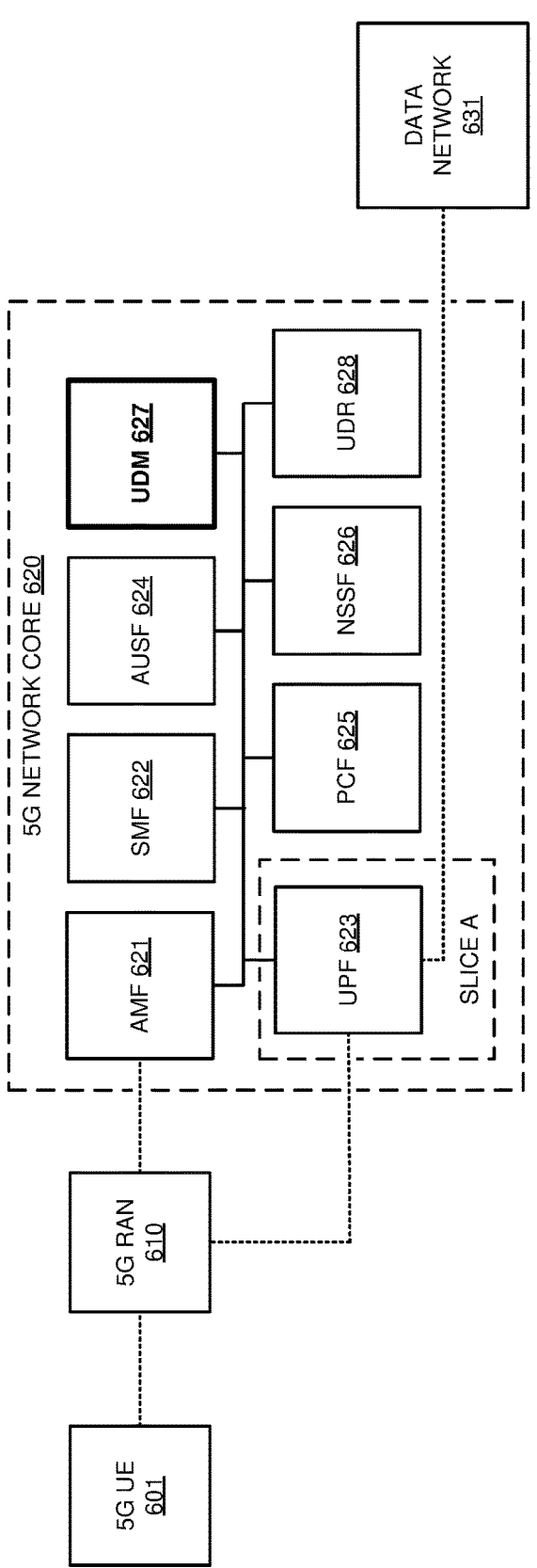
FIG. 6 illustrates a Fifth Generation (5G) wireless communication network to select SDS rules for the wireless UE.

FIG. 6 illustrates 5G communication network 600 to select SDS rules for a 5G UE. 5G communication network 600 comprises an example of communication network 100 illustrated in FIG. 1 and wireless communication network 300 illustrated in FIG. 3, however networks 100 and 300 may differ. 5G communication network 600 comprises 5G UE 601, 5G Radio Access Network (RAN) 610, 5G network core 620, and data network 631. 5G network core 620 comprises Access and Mobility Management Function (AMF) 621, Session Management Function (SMF) 622, User Plane Function (UPF), Authentication Server Function (AUSF) 624, Policy Control Function (PCF) 625, Network Slice Selection Function (NSSF) 626, Unified Data Management (UDM) 627, and Unified Data Registry (UDR) 628. Other network functions and network entities like Network Repository Function (NRF), Equipment Identity Register (EIR), Session Communication Proxy (SCP), Network Exposure Function (NEF), and Application Function (AF) are typically present in 5G network core 620 but are omitted for clarity. In other examples, 5G communication network 600 may comprise different or additional elements than those illustrated in FIG. 6.

In some examples, 5G UE 601 wirelessly attaches to RAN 610. UE 601 exchanges attachment signaling with RAN 610 to establish a signaling link between the 5G network applications hosted by UE 601 and the 5G network applications hosted by RAN 610. Exemplary 5G network applications include Radio Resource Control (RRC), Service Data Adaption Protocol (SDAP), Packet Data Convergence Protocol (PDCP), Radio Link Control (RLC), Media Access Control (MAC), and Physical Layer (PHY). UE 601 transfers a registration request over the signaling link to RAN 610. The registration request includes information like a registration type, 5G-Global Unique Temporary Identifier (GUTI), UE capabilities, Network Slice Selection Assistance Information (NSSAI) requests, Protocol Data Unit (PDU) session requests, PLMN, and the like. RAN 610 forwards the registration request for UE 601 to AMF 621. In response to the registration request, AMF 621 transfers an identity request to UE 601 over RAN 610. UE 601 indicates its Subscriber Concealed Identifier (SUCI) to AMF 621 over RAN 610. AMF 621 selects AUSF 624 to authenticate UE 601. AMF 621 transfers an authentication request comprising the SUCI to AUSF 624. AUSF 624 transfers an authentication vector request to UDM 627. The authentication vector request includes the SUCI for UE 601. UDM 627 generates authentication vectors for the session based on the SUCI. UDM 627 returns the vectors and the Subscriber Permanent Identifier (SUPI) for UE 601 to AUSF 624. The vectors include an authentication challenge, key selection criteria, and a random number. For example, UDM 627 may retrieve a secret key from the subscriber profile of UE 601 stored by UDR 628 and hash the random number with the secret key to generate the authentication challenge. AUSF 624 transfers the SUPI and authentication vectors to AMF 621. AMF 621 indicates the authentication type and transfers the authentication challenge, key selection criteria, and random number to UE 601 over RAN 610. UE 601 hashes the random number using its copy of the secret key to generate an authentication response transfers the response to AMF 621 over RAN 610.

AMF 621 determines the authentication response generated by UE 601 and the expected result match responsively registers UE 601 with network core 620. AMF 621 transfers an IMEI request to UE 601 to determine the device type for UE 601. UE 601 retrieves its IMEI from memory and indicates its IMEI to AMF 621 over RAN 610. Responsive to the successful registration, AMF 621 selects and registers with UDM 627 to generate UE context for UE 601. AMF 621 reads the first eight digits of the IMEI to determine the PEI TAC for UE 601. AMF 621 transfers UE context requests to UDM 627 for access and mobility subscription data, SMF selection data, and UE context SMF data. The requests include the AMF instance ID for AMF 621, a supported features list, the PEI TAC for UE 601, the PLMN for UE 601, and the like.

UDM 627 hosts a data structure or some other type of software structure to derive SDS rules based on the PEI TAC for UE 601, the billing code for UE 601, allowed NSSAI for UE 601, the PLMN for UE 601, the software version for UE 601, and/or the network/geographic location of AMF 621. For example, the data structure may comprise a machine learning algorithm trained to recommend SMS rules based on the set of input conditions. UDM 627 accesses the subscriber profile for UE 601 to retrieve the billing code, allowed NSSAI, and software version for UE 601. UDM 627 determines the network region for AMF 621 based on the AMF instance ID included in the request. For example, UDM 627 may host a table that correlates information like the network function instance ID, network function Frequently Qualified Domain Name (FQDN), or network function Internet Protocol (IP) address to a network or geographic location. UDM 627 inputs the PEI TAC, billing code, allowed NSSAI, PLMN, software version, and AMF location into the data structure to derive a set of SDS rules for UE 601. UDM 627 uses the SDS rules to select shared service attributes to override subscribed service attributes of UE 601. By overriding ones of the subscribed service attributes, UDM 627 may improve network capacity and performance. For example, the network region where AMF 621 is located may be heavily loaded and the resulting output from the data structure may generate SDS rules that select for shared service attributes to reduce the overall QoS provided to UE 601. In doing so, UDM 627 may maintain the capacity of heavily loaded network regions without adversely impacting the performance of the network.

UDM 627 accesses the subscriber profile for UE 601 stored by UDR 628 and retrieves UE context data including access and mobility subscription data, SMF subscription data, SMS management subscription data, DNN configuration, trace data, Single-NSSAIs (S-NSSAIs), and virtual group data. UDM 627 accesses shared subscription data stored by UDR 628 and selects shared service attributes like shared access and mobility subscription data, shared SMF subscription data, shared SMS management subscription data, shared DNN configuration, shared trace data, shared S-NSSAIs, and shared virtual group data based on the SDS rules. For example, the PLMN and PEI TAC may generate SDS rules that select for shared access and mobility data and session management data, the allowed NSSAI may generate SDS rules that select for shared trace data, the billing ID may select for SDS rules that select for shared trace data and session management data, and the AMF region may select for SDS rules that select for shared SMS data. In some examples, the SDS rules may indicate that UE 601 does not qualify for any shared service attributes.

UDM 627 overrides subscribed service attributes for UE 601 with corresponding ones of the shared service attributes that were selected based on the SDS rules. For example, if UDM 627 may select shared DNN configurations for UE 601 based on the SDS rules and override UE 601's subscribed DNN configurations. UDM 627 transfers a UE context response to AMF 621 that includes the non-overridden subscribed service attributes for UE 601 and the selected shared service attributes for UE 601. AMF 621 creates UE context using the received data. The UE context comprises the shared and subscribed access and mobility subscription data, SMF subscription data, SMS management subscription data, DNN configurations, trace data, S-NS-SAIs, and virtual group data.

AMF 621 selects PCF 625 to create a network policy association for UE 601. AMF 621 registers UE 601 with PCF 625 for access and mobility policy association, UE policy association, or both. PCF 625 registers UE 601 and transfers access and mobility policy information and UE policy rules for UE 601 to AMF 621. PCF 625 subscribes for event reporting from AFM 621 like registration state change events for UE 601.

AMF 621 selects NSSF 626 to select network slices for UE 601. AMF 621 indicates the NSSAIs requested by UE 601 in the registration request and the S-NSSAIs retrieved in the UE context to NSSF 626. If the UE context comprises shared S-NSSAIs (e.g., UE 601's subscribed S-NSSAIs were overridden), AMF 621 transfers the shared S-NSSAIs to NSSF 626. NSSF 626 uses the S-NSSAIs and the requested NSSAIs to select one or more network slices for UE 601. NSSF 626 returns slice IDs for the selected slices to AMF 621. For example, NSSF 626 may select an Ultra-Reliable Low-Latency Communications (URLLC) slice for UE 601 and an Enhanced Mobile Broadband (eMBB) slice for UE 601. FIG. 6 illustrates a single network slice for sake of clarity however it should be appreciated that a UE may be assigned multiple network slices, typically up to eight. In this example, the network slice comprises UPF 623, however network slices may comprise additional network functions (e.g., SMF 622) and/or multiple UPFs.

AMF 621 selects SMF 622 to serve UE 601 based on the SMF selection data, the slice IDs, QOS metrics, requested PDU sessions, and/or other data received from UDM 627 or received in the registration request from UE 601. If the UE context comprises shared SMF selection data (e.g., UE 601's subscribed SMF selection data was overridden), AMF 621 uses the shared SMF selection data to select SMF 622. AMF 621 directs SMF 622 to serve UE 601 and indicates the requested PDU sessions for UE 601 to SMF 622.

SMF 622 receives the direction from AMF 621 and assigns a UE IP address for the PDU session. SMF 622 selects UPF 623 based on the slice IDs selected by NSSF 626 and directs UPF 623 to serve UE 601. SMF 622 generates session context for the PDU session comprising information like the UE IP address and informs AMF 621 that the session context has been created. In response, AMF 621 transfers a registration accept message for UE 601 to RAN 610 and configures RAN 610 to serve the PDU sessions. RAN 610 forwards the registration accept message to UE 601. The registration accept message includes information like PDU session IDs and the UE IP address for UE 601 to use to route PDU session data, S-NSSAIs, allowed NSSAI, aggregate bitrate information, and the like. If the UE context comprises shared S-NSSAIs (e.g., UE 601's subscribed S-NSSAIs were overridden), AMF 621 includes the shared S-NSSAIs in the registration accept message. RAN 610 wirelessly transfers the registration accept message to UE 601.

In response to the registration accept message, UE 601 initiates PDU sessions with network core 620 using the information received in the registration accept message. UE 601 generates uplink user data for its PDU sessions. UE 601 wirelessly transfers the uplink data to RAN 610. RAN 610 transfers the uplink user data to UPF 623. UPF 623 transfers the uplink data to data network 631. Data network 631 generates downlink data for the PDU sessions and transfers the downlink data to UPF 623. UPF 623 transfers the downlink data to RAN 610. RAN 610 wirelessly transfers the downlink data to UE 601.

Figure 7:
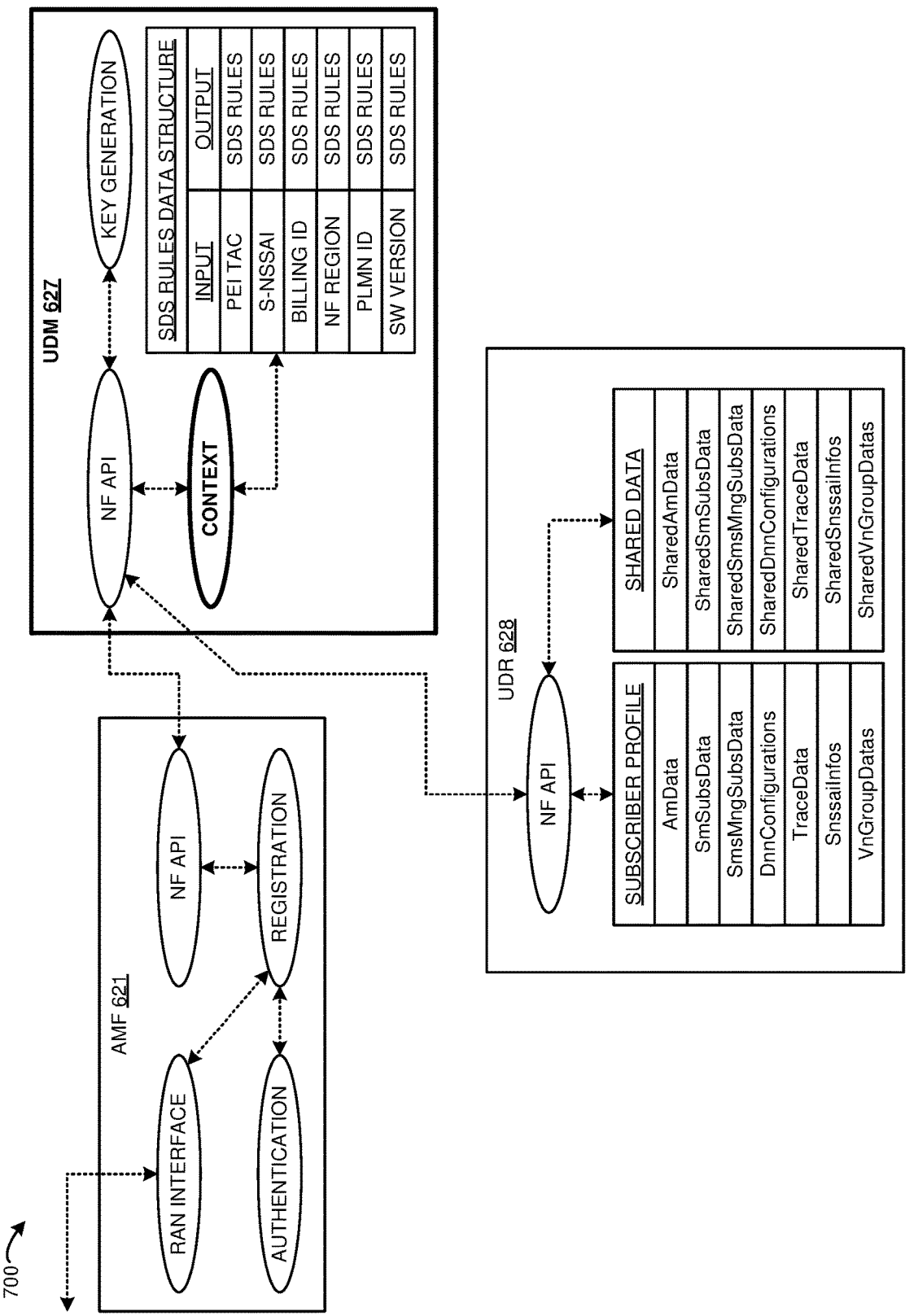
FIG. 7 illustrates network functions in the 5G wireless communication network.

FIG. 7 illustrates AMF 621, UDM 627, and UDR 628 in 5G wireless communication network 600. AMF 621 comprises modules for UE registration, UE authentication, network function (NF) Application Programming Interface (API), and RAN interfacing. The registration module generates and exchanges registration signaling with UE 601. The authentication module generates authentication data for UE 601 like authentication challenges and confirms authentication responses received from UE. UDM 627 comprises modules for network function API, key generation, and UE context generation and hosts an SDS rules data structure. The key generation module generates authentication data for AMF 621 to use to authenticate UE 601. The context management module retrieves subscribed service attributes for UE 601 from UDR 628, derives SDS rules for UE 601 using the SDS rules data structure, selects shared service attributes for UE 601 stored by UDR 628 using the SDS rules, and overrides subscribed service attributes using corresponding ones of the shared service attributes. The SDS rules data structure correlates input conditions including PEI TAC, S-NSSAI, billing ID, network function region, PLMN ID, and software (SW) version to SDS rules. UDR 628 comprises modules for network function API and stores a subscriber profile for UE 601 and a shared data profile. The subscriber profile comprises service attributes like access and mobility data (AmData), session management subscription data (SmSubsData), SMS management subscription data (SmsMngSubsData), DNN configurations (DnnConfigurations), Trace Data (TraceData), S-NSSAI information (SnssaiInfos), and virtual network group data (VnGroupDatas). The shared data profile comprises shared service attributes that correspond to the subscribed service attributes (e.g., sharedAmData). The interfacing modules allow AMF 621. UDM 627, and UDR 628 to exchange signaling with each other, the other network functions in 5G core 620, and with external systems like RAN 610.

Figure 8:
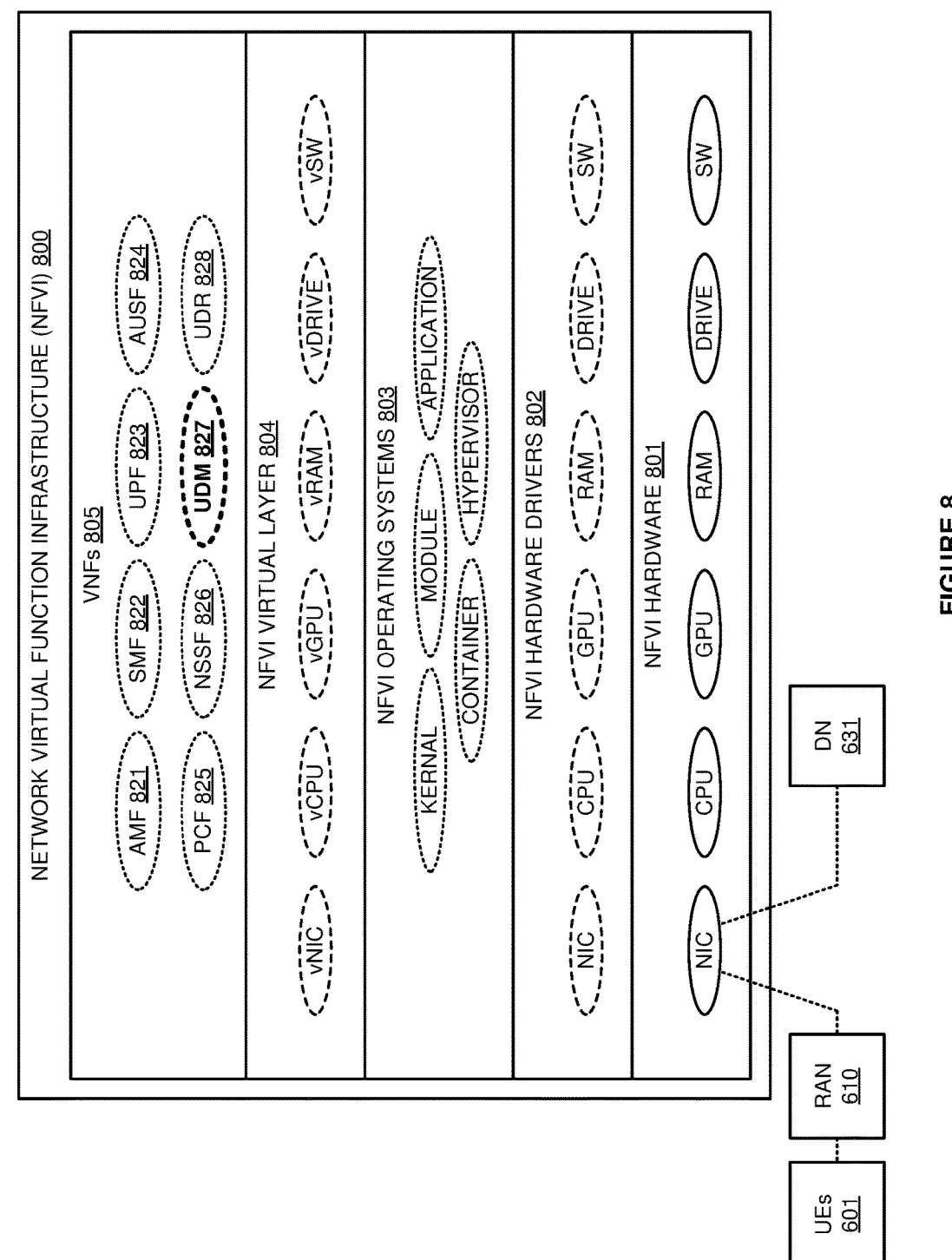
FIG. 8 illustrates a Network Function Virtualization Infrastructure (NFVI) in the 5G wireless communication network.

FIG. 8 illustrates Network Function Virtualization Infrastructure (NFVI) 800 in 5G wireless communication network 600. NFVI 800 comprises an example of core network 121 illustrated in FIG. 1 and network circuitry 320 illustrated in FIG. 3, although core network 121 and network circuitry 320 may differ. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, GPU, RAM, Flash/Disk Drives (DRIVE), and Data Switches (SW). NFVI hardware drivers 802 comprise software that is resident in the NIC, CPU, GPU, RAM, DRIVE, and SW. NFVI operating systems 803 comprise kernels, modules, applications, containers, hypervisors, and the like. NFVI virtual layer 804 comprises vNIC, vCPU, vGPU, vRAM, vDRIVE, and vSW. NFVI VNFs 805 comprise AMF 821, SMF 822, UPF 823, AUSF 824, PCF 825, NSSF 826, UDM 827, and UDR 828. Additional VNFs and network elements like NRF, SCP, EIR, NEF, and AF are typically present but are omitted for clarity. NFVI 800 may be located at a single site or be distributed across multiple geographic locations. The NIC in NFVI hardware 801 is coupled to RAN 610 and data network (DN) 631. NFVI hardware 801 executes NFVI hardware drivers 802, NFVI operating systems 803, NFVI virtual layer 804, and NFVI VNFs 805 to form AMF 621, SMF 622, UPF 623, AUSF 624, PCF 625, NSSF 626, UDM 627, and UDR 628.

FIG. 9 further illustrates NFVI 800 in 5G communication network 600. AMF 621 comprises capabilities for UE access registration, UE connection management, UE mobility management, UE authentication, and UE authorization. SMF 622 comprises capabilities for session establishment, session management, UPF selection/control, and network address allocation. UPFs 623 comprise capabilities for packet routing, packet forwarding, QoS handling, and PDU serving. AUSF 624 comprises capabilities for UE authentication support. PCF 625 comprises capabilities for network policy enforcement and network policy control. NSSF 626 comprises capabilities for network slice selection and network slice allowance. UDM 627 comprises capabilities for UE subscription management, UE credential generation, UE access authorization, SDS rules selection, and SDS rules enforcement. UDR 628 comprises capabilities for network data storage, subscriber data storage, and shared data storage.

In some examples, AMF 621 receives a registration request transferred by UE 601 that includes a registration type, 5G-GUTI, UE capabilities, NSSAI requests, PLMN ID, and PDU session requests. AMF 621 transfers an identity request for UE 601 and subsequently receives the SUCI for UE 601. AMF 621 transfers an authentication request comprising the SUCI to AUSF 624. AUSF 624 interfaces with UDM 627 to generate authentication vectors for UE 601. AUSF 624 transfers the authentication vectors to AMF 621. The vectors may include an authentication challenge, key selection criteria, and random number based on the authentication vectors. AMF 621 uses the authentication vectors to verify the identity of UE 601. Once authenticated, AMF 621 transfers an IMEI request for UE 601 and subsequently receives UE 601's IMEI. AMF 621 determines the PEI TAC for UE 601 based on the IMEI. AMF 621 transfers UE context requests to UDM 627 that include the AMF instance ID for AMF 621, a supported features list, and the PEI TAC for UE 601, and the PLMN ID for UE 601.

In this example, UDM 627 hosts a machine learning algorithm trained to recommend SDS rules based on PEI TAC, billing code, allowed NSSAI, software version, PLMN ID, and the network function region. For example, the machine learning algorithm may comprise an artificial neural network, convolutional neural network, and/or some other type of machine learning algorithm. UDM 627 accesses the subscriber profile for UE 601 to retrieve the billing code, allowed NSSAI, and software version for UE 601. UDM 627 determines the network region for AMF 621 based on the AMF instance ID included in the request. UDM 627 derives numeric representations (or some other type of machine learning consumable data form) for the PEI TAC, billing code, allowed NSSAI, PLMN ID, software version, and AMF region and feeds the numeric representations into the machine learning algorithm. In this example, the machine learning algorithm outputs an indication that UE 601 does not qualify for SDS rules. For example, UE 601 may not qualify for SDS due to device type limitations, billing deficiencies, network loading conditions, requested slice type types, home PLMN ID, and the like. In response, UDM 627 forgoes selecting shared service attributes to override subscribed service attributes of UE 601.

UDM 627 accesses the subscriber profile for UE 601 stored by UDR 628 and retrieves UE context data including access and mobility subscription data, SMF subscription data, SMS management subscription data, DNN configuration, trace data, Single-NSSAIs (S-NSSAIs), and virtual group data. UDM 627 transfers a UE context response to AMF 621 that includes the subscribed service attributes for UE 601. The context response does not include any shared service attributes for UE 601 as UE 601 did not qualify for SDS. AMF 621 creates UE context using the received data. AMF 621 registers UE 601 with PCF 625 for access and mobility policy association, UE policy association, or both. PCF 625 returns access and mobility policy information and UE policy rules for UE 601 to AMF 621. AMF 621 selects NSSF 626 to select network slices for UE 601. AMF 621 indicates the NSSAIs requested by UE 601 in the registration request and the S-NSSAIs retrieved in the UE context to NSSF 626. Since UE 601 did not qualify for SDS, AMF 621 does not include shared S-NSSAIs in the request. NSSF 626 uses the S-NSSAIs and the requested NSSAIs to select one or more network slices for UE 601. NSSF 626 returns slice IDs for the selected slices to AMF 621.

AMF 621 selects SMF 622 to serve UE 601 based on the SMF selection data, the slice IDs, QOS metrics, requested PDU sessions, and/or other data received from UDM 627 or received in the registration request from UE 601. Since UE 601 did not qualify for SDS, AMF 621 does not use shared SMF selection data to select SMF 622. AMF 621 directs SMF 622 to serve UE 601 and indicates the requested PDU sessions for UE 601 to SMF 622. SMF 622 receives the direction from AMF 621 and assigns a UE IP address for the PDU session. SMF 622 selects UPF 623 based on the slice IDs selected by NSSF 626 and directs UPF 623 to serve UE 601. SMF 622 notifies AMF 621 that the PDU sessions for UE 601 may begin. In response, AMF 621 transfers a registration accept message for UE 601 and configures RAN 610 to serve the PDU sessions. Subsequently, UPF 623 receives uplink data for the PDU sessions transferred by UE 601 and forwards the uplink data to data network 631. UPF 623 receives downlink data for the PDU sessions transferred by data network 631 and forwards the downlink data to UE 601.

Figure 10:
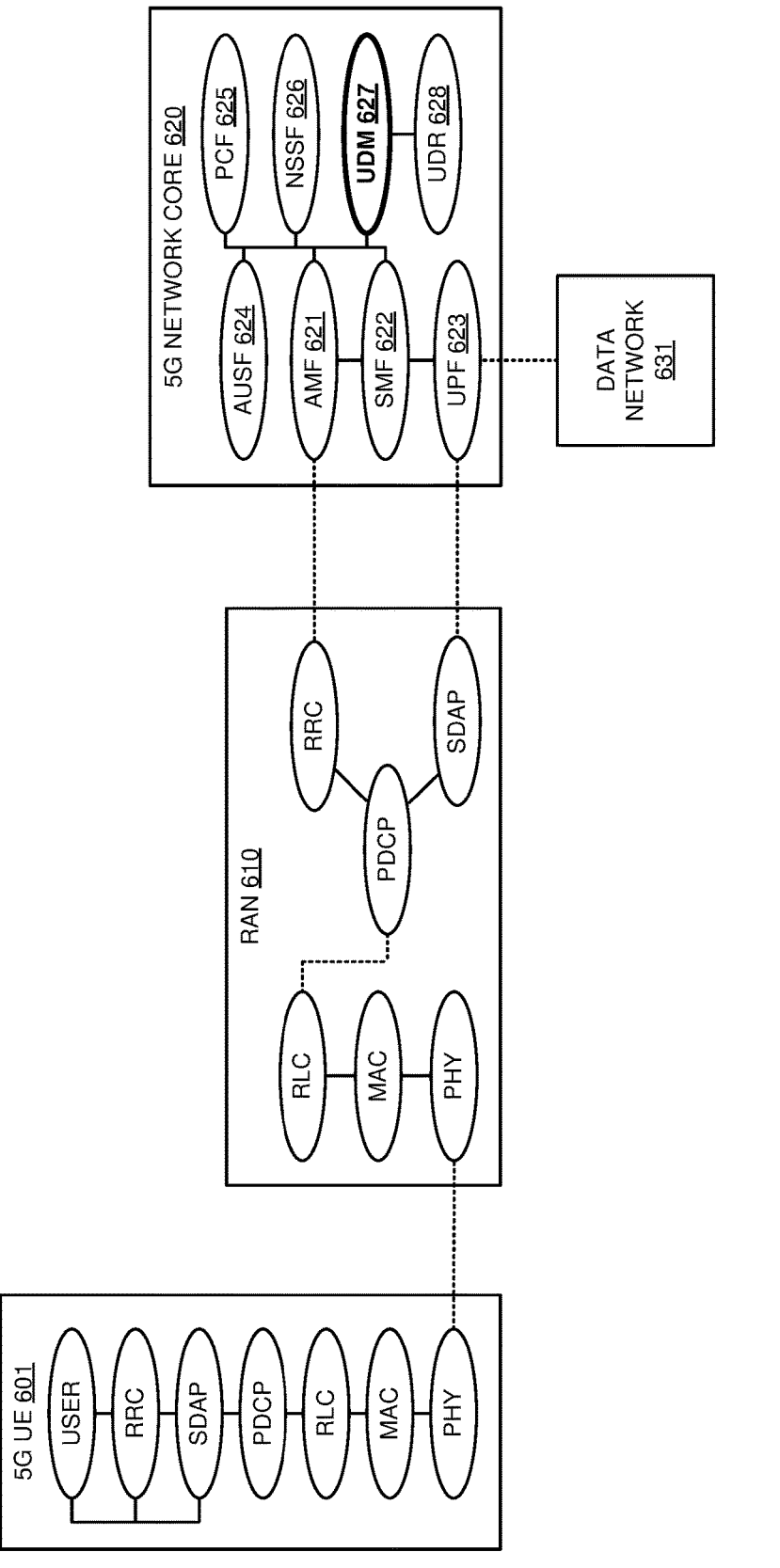
FIG. 10 illustrates an exemplary operation of the 5G wireless communication network to select SDS rules for the wireless UE.

FIG. 10 illustrates an exemplary operation of 5G communication network 600 to select SDS rules for a 5G UE. The operation may vary in other examples. As illustrated in FIG. 10, UE 601 and RAN 610 host 5G network applications for RRC, SDAP, PDCP, RLC, MAC, and PHY. UE 601 also hosts a user application (USER). In some examples, the RRC in UE 601 wirelessly attaches to the RRC in RAN 610. The RRC in UE 601 exchanges attachment signaling with the RRC in RAN 610 to establish a signaling link. The RRC in UE 601 transfers a registration request over to the RRC in RAN 610 over the PDCPs, RLCs, MACs, and PHYS. The registration request includes indicate a registration type, 5G-GUTI, UE capabilities, NSSAI requests, PLMN ID, and PDU session requests. The RRC in RAN 610 forwards the registration request to AMF 621. AMF 621 responds to the request by transferring an identity request for UE 601 to the RRC in RAN 610. The RRC in RAN 610 forwards the request to the RRC in UE 601 over the PDCPs, RLCs, MACs, and PHYs. The RRC retrieves the SUCI for UE 601 from memory and transfers the SUCI to the RRC in RAN 610 over the PDCPs, RLCs, MACs, and PHYs. The RRC in RAN 610 forwards the SUCI to AMF 621.

AMF 621 transfers an authentication request that includes SUCI to AUSF 624. AUSF 624 requests authentication vectors from and indicates the SUCI to UDM 627. UDM 627 generates an authentication challenge, key selection criteria, and a random number based on the SUCI and returns the vectors and the SUPI for UE 601 to AUSF 624. AUSF 624 transfers the SUPI and authentication vectors to AMF 621. AMF 621 indicates the authentication type and transfers the authentication challenge, key selection criteria, and random number to the RRC in RAN 610. The RRC in RAN 610 transfers the authentication type, authentication challenge, key selection criteria, and random number to the RRC in UE 601 over the PDCPs, RLCs, MACs, and PHYs. The RRC in UE 601 generates an authentication response and transfers the response to the RRC in RAN 610 over the PDCPs, RLCs, MACs, and PHYs. The RRC in RAN 610 forwards the authentication response to AMF 621.

AMF 621 matches the authentication response generated by UE 601 to the expected result to authenticate UE 601. In response, AMF 621 transfers an identity request for UE 601 to the RRC in RAN 610. The RRC in RAN 610 forwards the identity request to the RRC in UE 601 over the PDCPs, RLCs, MACs, and PHYs. The RRC in UE 601 retrieves the IMEI for UE 601 from memory and transfers the IMEI to the RRC in RAN 610 over the PDCPs, RLCs, MACs, and PHYs. The RRC in RAN 610 forwards the IMEI to AMF 621. AMF 621 interacts with other network entities like EIR to determine if UE 601 is authorized to be on network 600 based on the IMEI. In response to determining UE 601 is authorized to access network 600, AMF 621 registers UE 601. Responsive to the successful registration, AMF 621 registers with UDM 627 to generate UE context for UE 601. AMF 621 determines the PEI TAC for UE 601 based on the first eight digits of the IMEI. AMF 621 transfers a UE context request to UDM 627 that includes the instance ID for AMF 621, a supported features list, the PLMN ID for UE 601, and the PEI TAC for UE 601. The request may include an indication the SDS is supported by AMF 621 and/or UE 601.

In response to the context request, UDM 627 accesses the subscriber profile for UE 601 to retrieve the billing code, allowed NSSAI, and software version for UE 601. UDM 627 determines the network region for AMF 621 based on the AMF instance ID included in the request. UDM 627 inputs the PEI TAC, billing code, allowed NSSAI, AMF region, PLMN ID, and software version into the data structure to derive a set of SDS rules for UE 601. In this example, the SDS rules indicate UE 601 qualifies for shared session management subscription data and shared DNN configurations. UDM 627 accesses the subscriber profile for UE 601 stored by UDR 628 and retrieves UE context data including access and mobility subscription data, SMF subscription data, SMS management subscription data, DNN configuration, trace data, S-NSSAIs, and virtual group data. UDM 627 accesses shared subscription data stored by UDR 628 and selects shared SMF subscription data and shared DNN configurations based on the SDS rules. UDM 627 overrides the subscribed SMF subscription data and subscribed DNN configurations for UE 601 with the shared SMF subscription data and the shared DNN configurations. UDM 627 transfers a UE context response to AMF 621 that includes the access and mobility subscription data, the shared SMF subscription data, SMS management subscription data, shared DNN configurations, trace data, S-NSSAIs, and virtual group data.

AMF 621 creates UE context using the received data. AMF 621 interfaces with PCF 625 to create a network policy association for UE 601 and interfaces with NSSF 626 to select network slices for UE 601. AMF 621 selects SMF 622 to serve UE 601 based on the shared SMF selection data. AMF 621 directs SMF 622 to serve UE 601 and indicates the requested PDU sessions for UE 601 to SMF 622. SMF 622 receives the direction from AMF 621 and allocates IP addresses for the requested sessions. SMF 622 selects UPF 623 based on the slice IDs selected by NSSF 626 and directs UPF 623 to serve UE 601. SMF 622 controls UPF 623 to route session data for UE 601 to data network 631 using the shared DNN configurations. SMF 622 notifies AMF 621 that the session is ready to begin. In response, AMF 621 transfers a registration accept message for UE 601 to the RRC in RAN 610. The RRC in RAN 610 forwards the registration accept message to the RRC in UE 601 over the PDCPs, RLCs, MACS, and PHYs. The RRC in UE 601 receives the registration accept message and stores the message data in memory.

The RRC in UE 601 detects the execution of a user application. In response, the RRC directs the SDAP in UE 601 to begin a PDU to support the user application. The user application in UE 601 generates uplink user data for the PDU session. The SDAP in UE 601 transfers the uplink data to the SDAP in RAN 610 over the PDCPs, RLCs, MACs, and PHYs. The SDAP in RAN 610 transfers the uplink user data to UPF 623. UPF 623 routes the uplink data to data network 631 based on the shared DNN configurations. Data network 631 generates downlink data for the PDU session and transfers the downlink data to UPF 623. UPF 623 transfers the downlink data to the SDAP in RAN 610. The SDAP in RAN 610 transfers the downlink data to the SDAP in UE 601 over the PDCPs, RLCs, MACs, and PHYS.

The wireless data network circuitry described above comprises computer hardware and software that form special-purpose network circuitry to select SDS rules for user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to select SDS rules for user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to select Shared Data Support (SDS) rules for a user device, the method comprising:

a network controller receiving a registration request transferred by the user device for service on the wireless communication network and in response, transferring a subscription data request to a network data system;

the network data system receiving the subscription data request, accessing a subscriber profile for the user device, and retrieving subscription data for the user device;

the network data system determining a device type for the wireless user device, selecting the SDS rules for the wireless user device based on the device type, and selecting shared subscription data for the user device based on the SDS rules;

the network data system transferring the subscription data and the shared subscription data to the network controller; and the network controller receiving the subscription data and the shared subscription data, generating device context based on the subscription data and the shared subscription data, and serving the wireless user device based on the device context.

2. The method of claim 1 further comprising:

the network data system determining a network slice Identifier (ID) for the wireless user device; and wherein:

the network data system selecting the SDS rules for the wireless user device based on the device type comprises selecting the SDS rules for the wireless user device based on the device type and the network slice ID.

3. The method of claim 1 further comprising:

the network data system determining a billing Identifier (ID) for the wireless user device; and wherein:

the network data system selecting the SDS rules for the wireless user device based on the device type comprises selecting the SDS rules for the wireless user device based on the device type and the billing slice ID.

4. The method of claim 1 further comprising:

the network data system determining a geographic location for the network controller; and wherein:

the network data system selecting the SDS rules for the wireless user device based on the device type comprises selecting the SDS rules for the wireless user device based on the device type and the geographic location.

5. The method of claim 1 further comprising:

the network data system determining a network slice Identifier (ID) for the wireless user device, determining a billing ID for the wireless user device, and determining a geographic location for the network controller; and wherein:

the device type comprises a Permanent Equipment Identifier Type Allocation Code (PEI TAC); and the network data system selecting the SDS rules for the wireless user device based on the device type comprises selecting the SDS rules for the wireless user device based on the PEI TAC, the network slice ID, the billing ID, and the geographic location.

6. The method of claim 1 wherein the shared subscription data comprises one or more shared access and mobility subscription data, shared session management subscription data, shared Short Message Service (SMS) management subscription data, shared Data Network Name (DNN) subscription data, shared trace data, shared Network Slice Selection Assistance Information (NSSAI) data, or shared virtual network group data.

7. The method of claim 6 wherein:

the network data system selecting shared subscription data for the user device based on the SDS rules comprises selecting one or more of the shared access and mobility subscription data, shared session management subscription data, shared SMS management subscription data, shared DNN subscription data, shared trace data, shared NSSAI data, or shared virtual network group data based on the SDS rules; and the network data system transferring the subscription data and the shared subscription data to the network controller comprises the network data system transferring the subscription data and selected ones of the shared access and mobility subscription data, shared session management subscription data, shared SMS management subscription data, shared DNN subscription data, shared trace data, shared NSSAI data, or shared virtual network group data to the network controller.

8. A wireless communication network to select Shared Data Support (SDS) rules for a user device, the wireless communication network comprising:

a network controller to receive a registration request transferred by the user device for service on the wireless communication network and in response, transfer a subscription data request to a network data system;

the network data system to receive the subscription data request, access a subscriber profile for the user device, and retrieve subscription data for the user device;

the network data system to determine a device type for the wireless user device, select the SDS rules for the wireless user device based on the device type, and select shared subscription data for the user device based on the SDS rules;

the network data system to transfer the subscription data and the shared subscription data to the network controller; and the network controller to receive the subscription data and the shared subscription data, generate device context based on the subscription data and the shared subscription data, and serve the wireless user device based on the device context.

9. The wireless communication network of claim 8 wherein:

the network data system is to determine a network slice Identifier (ID) for the wireless user device; and the network data system is to select the SDS rules for the wireless user device based on the device type and the network slice ID.

10. The wireless communication network of claim 8 wherein:

the network data system is to determine a billing Identifier (ID) for the wireless user device; and the network data system is to select the SDS rules for the wireless user device based on the device type and the billing slice ID.

11. The wireless communication network of claim 8 wherein:

the network data system is to determine a geographic location for the network controller; and the network data system is to select the SDS rules for the wireless user device based on the device type and the geographic location.

12. The wireless communication network of claim 8 wherein:

the device type comprises a Permanent Equipment Identifier Type Allocation Code (PEI TAC);

the network data system is to determine the PEI TAC for the wireless user device, a network slice Identifier (ID) for the wireless user device, a billing ID for the wireless user device, and a geographic location for the network controller; and the network data system is to select the SDS rules for the wireless user device based on the PEI TAC, the network slice ID, the billing ID, and the geographic location.

13. The wireless communication network of claim 8 wherein the shared subscription data comprises one or more shared access and mobility subscription data, shared session management subscription data, shared Short Message Service (SMS) management subscription data, shared Data Network Name (DNN) subscription data, shared trace data, shared Network Slice Selection Assistance Information (NSSAI) data, or shared virtual network group data.

14. The wireless communication network of claim 13 wherein:

the network data system is to select one or more of the shared access and mobility subscription data, shared session management subscription data, shared SMS management subscription data, shared DNN subscription data, shared trace data, shared NSSAI data, or shared virtual network group data based on the SDS rules to select the shared subscription data for the user device; and the network data system is to transfer the subscription data and the selected ones of the shared access and mobility subscription data, shared session management subscription data, shared SMS management subscription data, shared DNN subscription data, shared trace data, shared NSSAI data, or shared virtual network group data to the network controller.

15. A wireless communication network to select Shared Data Support (SDS) rules for a User Equipment (UE), the wireless communication network comprising:

an Access and Mobility Management Function (AMF) to receive a registration request transferred by the UE and in response, transfer a subscription data request to a Unified Data Management (UDM);

the UDM to receive the subscription data request, access a subscriber profile for the UE stored by a Unified Data Repository (UDR), and retrieve subscription data for the UE from the UDR;

the UDM to determine a Permanent Equipment Identifier Type Allocation Code (PEI TAC) for the UE, select the SDS rules for the UE based on the PEI TAC, and retrieve shared subscription data for the UE from the UDR based on the SDS rules;

the UDM to transfer the subscription data and the shared subscription data to the AMF; and the AMF to receive the subscription data and the shared subscription data, generate UE context based on the subscription data and the shared subscription data, and serve the UE based on the UE context.

16. The wireless communication network of claim 15 wherein:

the UDM is to determine a network slice Identifier (ID) for the UE; and the UDM is to select the SDS rules for the UE based on the PEI TAC and the network slice ID.

17. The wireless communication network of claim 16 wherein:

the UDM is to determine a billing ID for the UE; and the UDM is to select the SDS rules for the UE based on the PEI TAC, the slice ID, and the billing ID.

18. The wireless communication network of claim 17 wherein:

the UDM is to determine a geographic location for the AMF; and the UDM is to select the SDS rules for the UE based on the PEI TAC, the slice ID, the billing ID, and the geographic location.

19. The wireless communication network of claim 15 wherein the shared subscription data comprises one or more shared access and mobility subscription data, shared Short Message Service (SMS) subscription data, shared SMS management subscription data, shared Data Network Name (DNN) subscription data, shared trace data, shared Network Slice Selection Assistance Information (NSSAI) data, or shared virtual network group data.

20. The wireless communication network of claim 19 wherein:

the UDM is to retrieve one or more of the shared access and mobility subscription data, shared SMS subscription data, shared SMS management subscription data, shared DNN subscription data, shared trace data, shared NSSAI data, or shared virtual network group data from the UDR based on the SDS rules to retrieve the shared subscription data for the UE; and the UDM is to transfer the subscription data and the retrieved ones of the shared access and mobility subscription data, shared SMS subscription data, shared SMS management subscription data, shared DNN sub-
scription data, shared trace data, shared NSSAI data, or
shared virtual network group data based on the SDS
rules to the AMF.

\* \* \* \* \*